June 23, 1931. H. F. MOLKENBUR 1,811,729
ROTARY ENGINE
Filed April 22, 1926 6 Sheets-Sheet 5
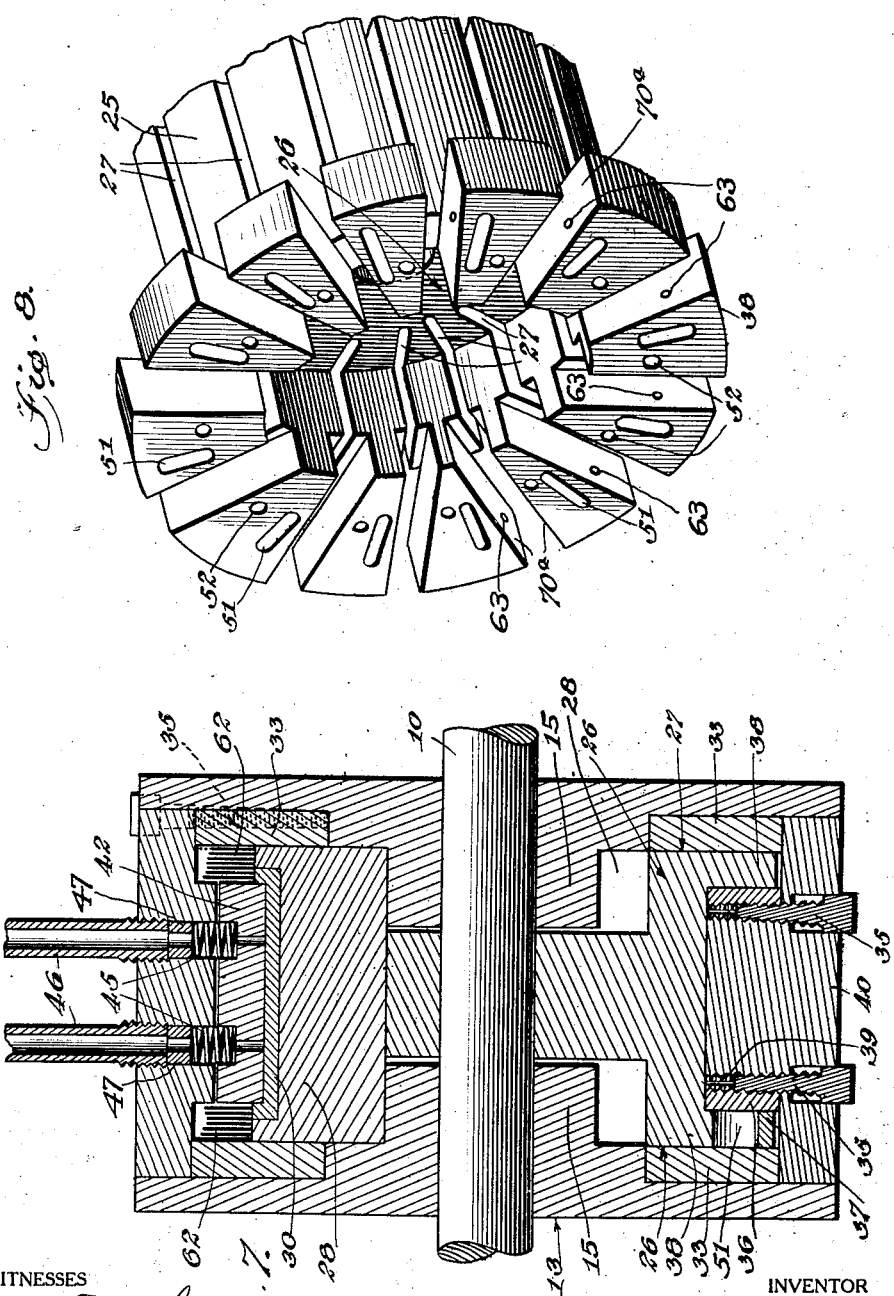

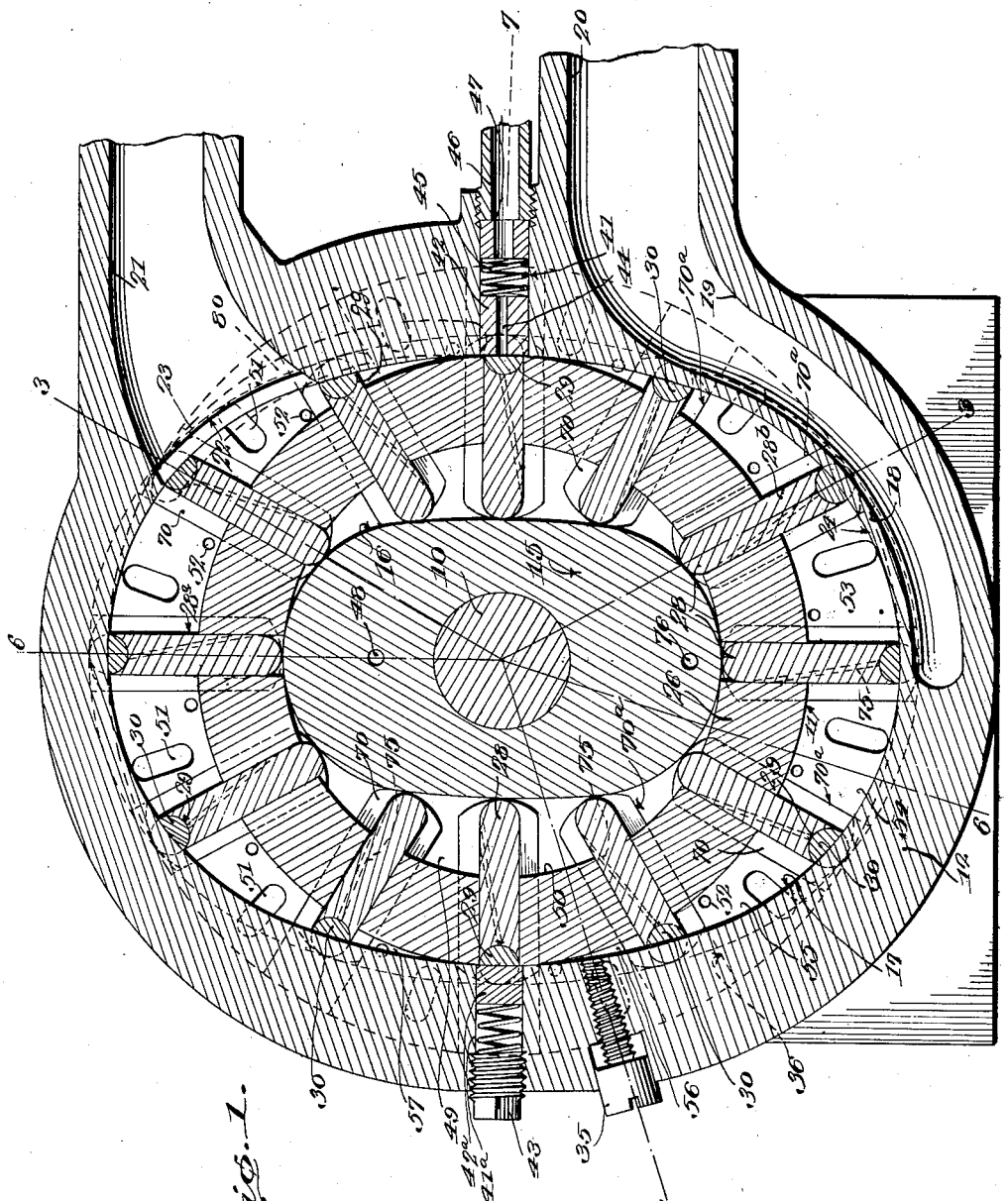

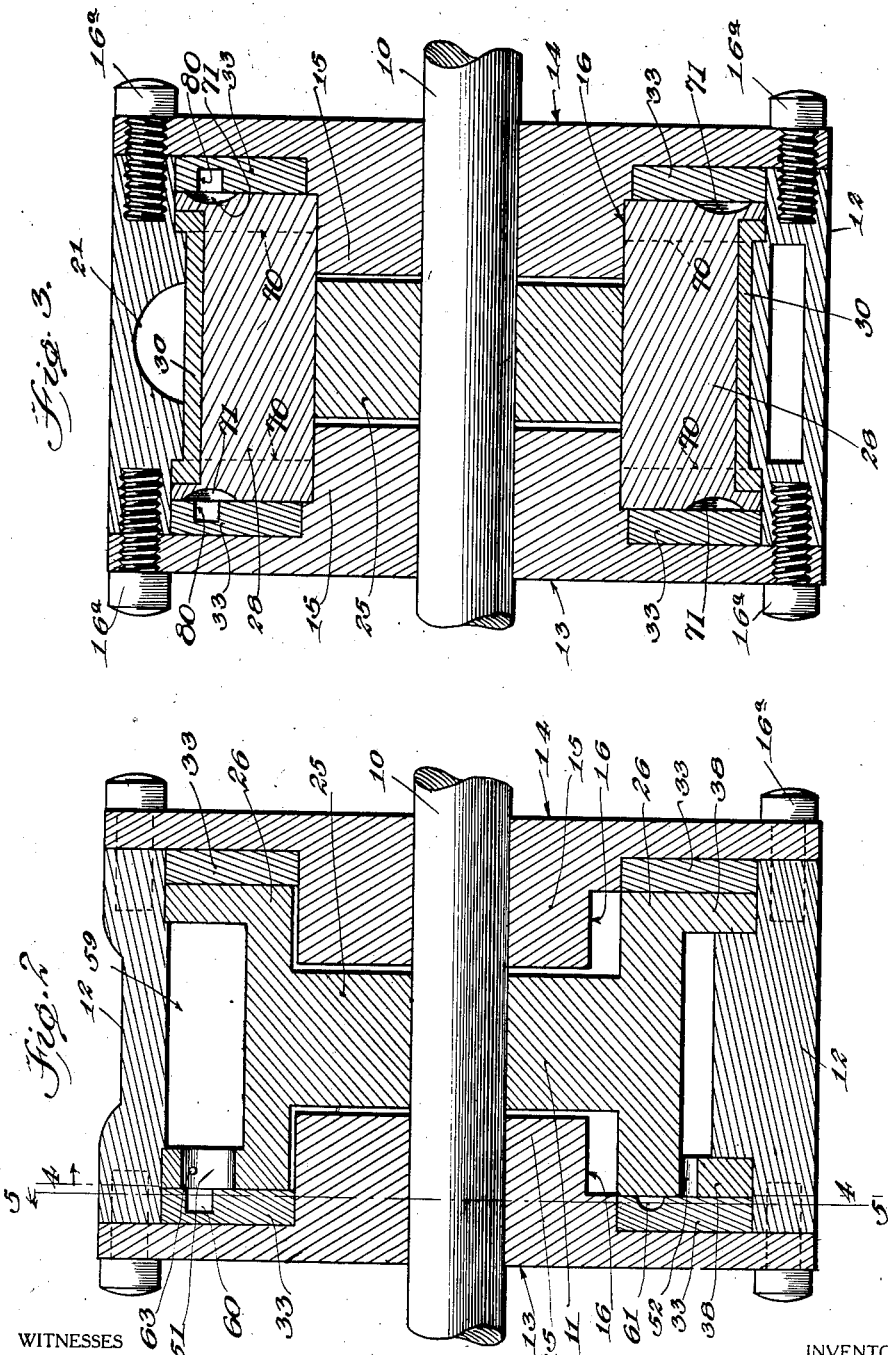

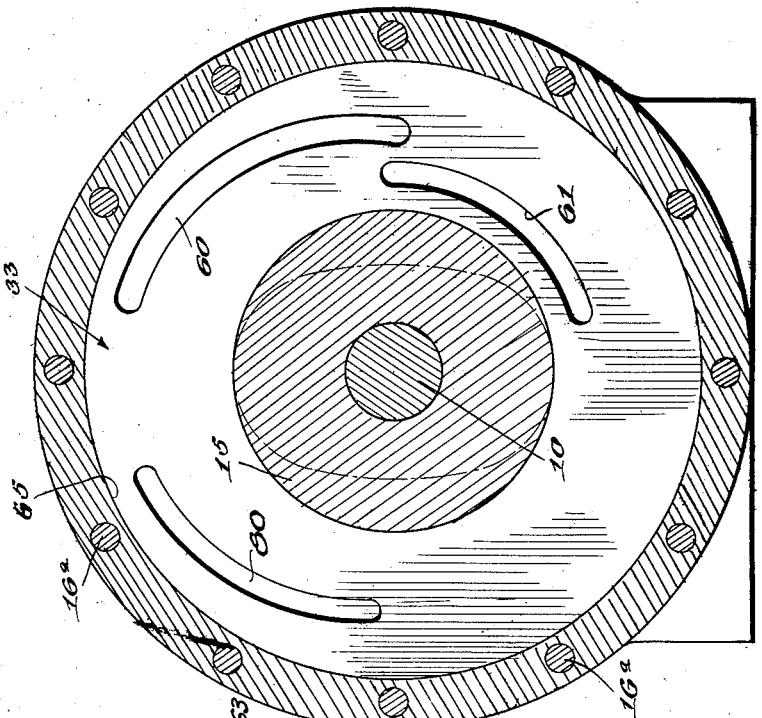
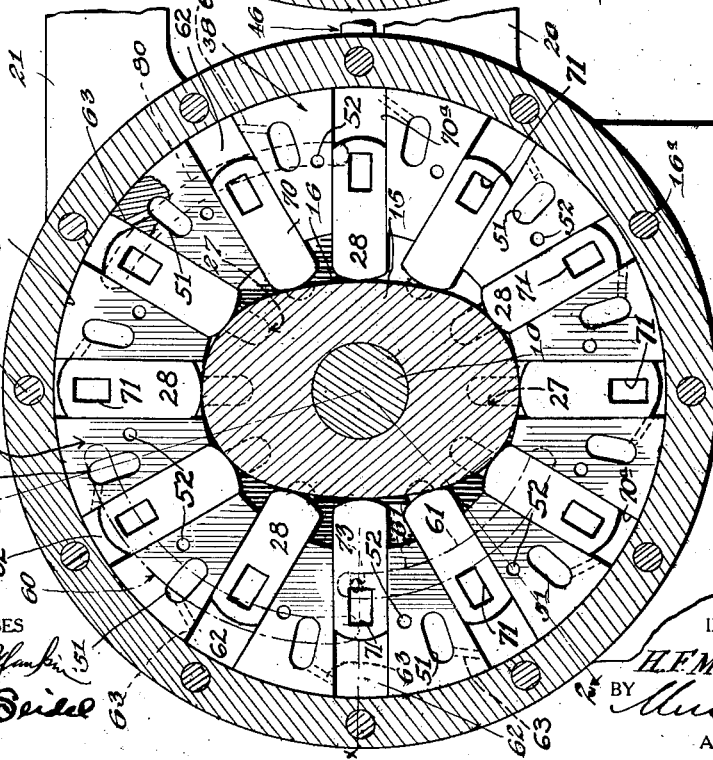

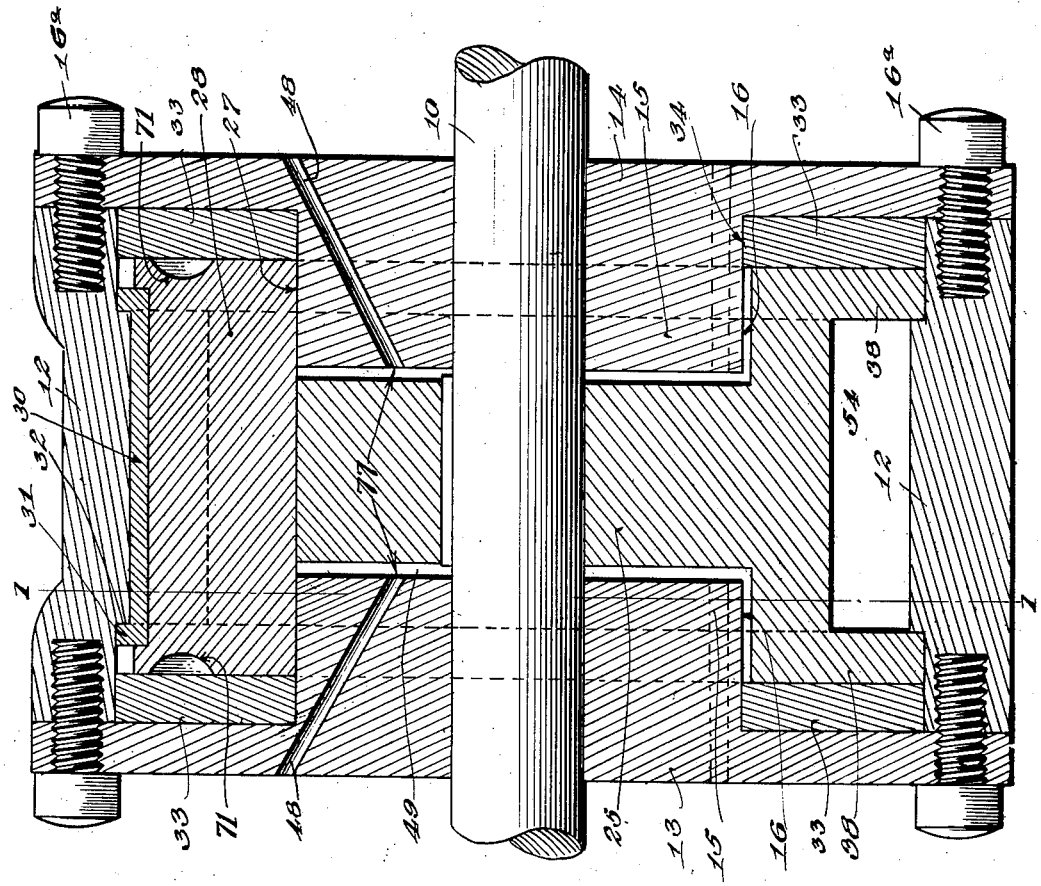

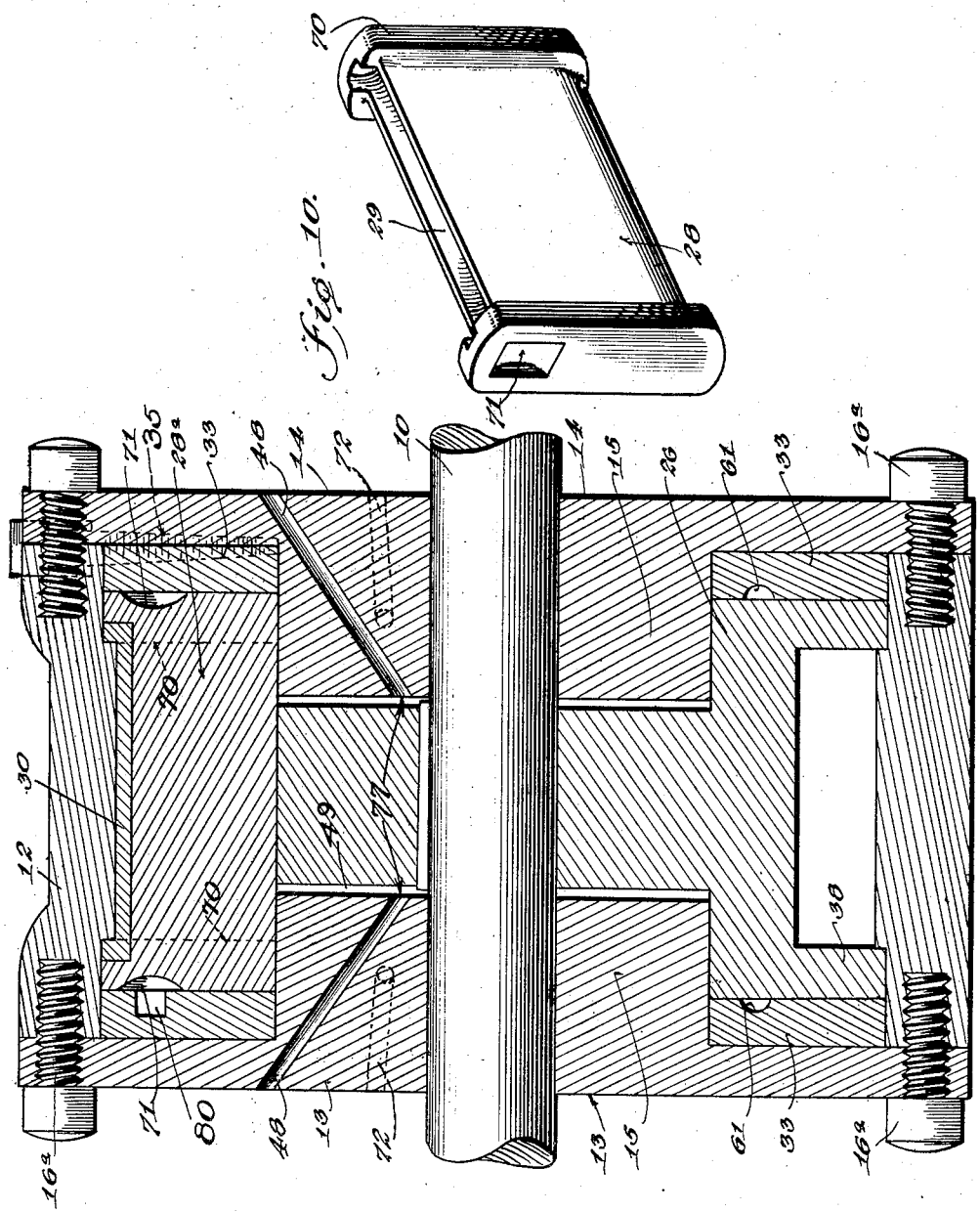

Patented June 23, 1931

1,811,729

UNITED STATES PATENT OFFICE

HENRY F. MOLKENBUR, OF BELLAIRE, WHITE BEAR LAKE, MINNESOTA

ROTARY ENGINE

Application filed April 22, 1926. Serial No. 103,944.

This invention relates to rotary engines.

An object of the invention is the provision of a device for producing a continuous flow of compressed fluids which are ignited, with the pressure of the ignited fluids being exerted upon a plurality of abutments.

Another object of the invention is the provision of a device for producing a continuous power output, the power being derived from a continuous flow of burning gases under pressure which travel circumferentially with the rotor and are exhausted at a point adjacent the admission of the fuel.

A further object of the invention is the provision of a rotary engine which may be operated on a combustible mixture from a carbureter or the same may be operated with various grades of heavier fuels and compressed air.

A still further object of the invention is the provision of a rotary engine operated by ignition of a continuous flow of compressed combustible fluid, the fluid being ignited by coming into contact with burning gases in a groove which connects the chambers carrying the compressed fluids, thereby making the ignition positively assured.

Another object of the invention is the provision of an engine of great reliability, positive in action, light in weight and simply constructed.

A further object of the invention is the provision of a rotary engine in which all the wearing parts may be readily adjusted without necessitating the disassembling of the engine or any part thereof.

This invention will be best understood from a consideration of the following detailed description, in view of the accompanying drawings, forming a part of this specification; nevertheless, it is to be understood that the invention is not confined to the disclosure, being susceptible of such changes and modifications which shall define no material departure from the salient features of the invention as expressed in the appended claims.

In the drawings:

Figure 1 is a transverse vertical section of a rotary engine constructed in accordance with the principles of my invention, Figure 2 is a section taken along the line 2—2 of Figure 4, Figure 3 is a section taken along the line 3—3 of Figure 1, Figure 4 is a vertical section taken along the line 4—4 of Figure 2, Figure 5 is a vertical section taken along the line 5—5 of Figure 2, Figure 6 is a transverse vertical section taken along the line 6—6 of Figure 1, Figure 7 is a section taken along the line 7—7 of Figure 1.

Figure 8 is a view in perspective of the rotor.

Figure 9 is a section of the engine showing the pockets in the sliding abutments associated with the grooves for exhausting burnt charges remaining in the pockets.

Figure 10 is a view in perspective of the sliding abutment for the rotor.

Referring more particularly to the drawings, 10 designates a shaft adapted to be driven by a rotor 11. This rotor is mounted within a housing formed by an annular casing 12 and side plates 13 and 14. The side plates are provided with inward projections 15 providing curved elliptical shoulders 16. The inward projections or enlargements 15 form a bearing for the shaft 10. The plates 13 and 14 are respectively bolted to the rim 12, as shown at 16a. The inner wall 17 of the annular casing 12 is elliptical in shape and conforms to the shape of the elliptical shoulders 16.

An inlet port 18 is provided at the lower end of the annular casing 12, and which is in direct communication with an inlet conduit 19 formed integrally with the casing 12. The outer end 20 of the conduit 19 is adapted to be connected with a carbureter when the engine is being operated by a combustible mixture but primarily is connected with a source of air under pressure or to the atmosphere for operating the engine with a heavier fuel than gasoline.

An exhaust conduit 21 is in open communication through a port 22 with the elliptical shaped chamber formed within the annular casing 12 and between the side walls 13 and 14. The port 22 is provided with a grating 23 for a purpose which will be presently explained, and the port 18 is likewise provided with a grating 24.

The rotor 11 is formed of a central disk 25 with enlargements at the outer ends thereof as shown at 26. These enlargements and central disk are provided with radial slots 27 in which are adapted to be reciprocated abutments 28. These abutments are rounded at their inner ends and are adapted to ride over the elliptical surface or shoulders 16 of the enlargements 15 and always have their outer ends in engagement with the elliptical surface of the casing 12. The outer free ends of the abutments are provided with grooves 29 running longitudinally of the abutments and in which are seated packing strips 30. The packing strips are rounded along their inner edges to conform to the curvature of the grooves 29 so that the packing strips may be revolved during the annular movement of the rotor 11.

The outer ends of the packing strips are provided with lugs 31 extending outwardly towards the casing 12 and adapted to ride in grooves 32 formed in the casing in order to aid in maintaining the packing strips in their proper position within the grooves 29. As the rotor is revolved these packing strips will ride over the gratings 23 and 24 which form a continuation of the elliptical surface 17 and prevent displacement of these strips at the inlet and exhaust ports.

Additional packing rings are shown at 33 upon opposite sides of the rotor and are adapted to be maintained in contact with the sides of the enlargements 26 of the rotor. These strips are in the shape of annular rings seated within the sockets formed around a shoulder 34 in the side plates 13 and 14.

The packing rings 33 are adapted to be adjusted towards the side walls of the rotor by conically shaped bolts 35, shown in Figures 7 and 9. Packing strips 36 are also provided to engage the inner faces 37 of the flanges 38 of the enlargements 26 of the rotor. These packing strips are forced against the inner faces 37 by means of conically shaped bolts 35 which act as wedges against the packing strips when said bolts are screwed into conically shaped threaded openings 39 formed in the thickened portion 40 of the casing 12 and at points along the circumference of the rim 12, only one bolt being shown for the purposes of illustration.

At diametrically opposite points are provided passages 41 and 41a in which are slidably mounted respectively, plungers 42 and 42a. The plunger 42 is provided with a central passage 44 through which oil is forced to lubricate the outer faces of the packing strips 30. The plungers are forced against the packing strips by means of a coil spring 45 located in each passage 41 and 41a and the tension in the case of the plunger 42 is regulated by means of a hollow pipe 46 which is screwed down upon a hollow sleeve 47 and in the case of the plunger 42a by a threaded plug 43. The pipe 46 is connected with a source of lubricant for supplying the passage 41 with oil. The plunger 42a engages the wall of the rotor and the outer edges of the packing strips 30 to aid in sealing the rotor against leakage at those points where the greatest degree of compression is obtained.

Passages 48 which are formed in the side walls 13 and 14 extend to the interior or hollow space 49 located between the shoulders 16 and the inner wall 50 of the rotor 11 for supplying lubricant to the interior of the engine. The lubricant is maintained at a predetermined level in the chamber 49 so that all of the inner ends of the sliding abutments 28 will be lubricated and the surface of the elliptical shoulders 16 will be splashed with oil as the inner ends of the abutments are forced around said shoulders.

The sliding abutments 28 have their opposite edges enlarged to provide laterally disposed flanges 70 sliding in groove 70a in the rotor.

The packing strips 36 are not employed adjacent the intake and exhaust ports since no pressure is exerted at these points due to the fact that the combustible mixture of air is being drawn in at the intake side and the burned gases are being discharged at the exhaust side.

The flanges 38 of the rotor are provided with a number of compression pockets shown at 51 and 52. The combustible mixture is compressed in the spaces 53—56 inclusive and forced into the pockets 51 and 52. During revolution of the rotor, the various spaces or chambers 53—56 inclusive will approach the horizontal passing through the axis of the rotor and since these spaces or chambers are gradually reduced in size, the greatest compression will take place in the chamber as indicated at 56 when the chamber has been reduced to a maximum degree at the horizontal. It will be noted that the chamber as indicated at 53 is at its maximum capacity and will decrease rapidly towards the horizontal or at 56 where it substantially disappears. Beyond the horizontal, however, the chamber will again begin to increase in size until it reaches its maximum capacity as indicated at 59. Beyond this point, the exhaust gases will be discharged into the exhaust conduit 21 when the ends of said chambers open into said conduit.

The packing ring 33 is provided with an arcuately shaped groove 60 and the pockets 51 are adapted to be successively alined with said groove as will be presently explained. This groove serves as a passage or race-way for the exploding gases that are discharged from the chambers 51 and 52 in which the combustible mixture has been compressed to its maximum. When a chamber reaches the point indicated at 57, combustion takes place. As each pocket 52 passes the horizontal indicated at $x$ in Figure 4, the contents of said pocket will be ignited, due to the contact of the gases in said pocket with the burning gases in channel 60. When the contents of pockets 51 are ignited, the burning gases from said pockets will enter channel 60 and continue along said channel until they are released beyond the chamber 59 into the exhaust passage. In view of the speed of rotation of the rotor, there will be a continuous stream of explosive charges acting upon the abutments 28 which are located above the horizontal and to the left of the vertical passing through the axis of the shaft 10.

It will be appreciated that in the description of the operation of the engine that it is taken for granted that a combustible mixture is supplied through the intake pipe 20 in the usual manner, the combustible mixture being supplied by a carburetor (not shown). Furthermore, it will be appreciated that in starting the engine some form of ignition may be employed (not shown) and which is well known in the art of ignition.

It is to be understood that no ignition takes place until pockets 52 and 51 aline with the channel 60 which has its lower end adjacent the horizontal line indicated at $x$. The pressure in the chamber indicated at 57 in Figure 1 is caused by the combustion of the combustible mixture which is brought to a high degree of compression when each chamber passes through the position indicated by the numeral 56 and this pressure is always in evidence when the engine is running. Since the pressure is considerably high due to the continuous explosion and as the ignition is maintained by the presence of burning gases in the groove 60, there is no possibility of the incoming compressed charges missing fire. The groove 60 serves at all times as a means for connecting the chambers 57—59 inclusive with each other so that the pressures in these chambers are substantially the same. While in the chambers indicated by the numerals 54—56 inclusive, the pressures will be progressively increased until the pressure has reached a maximum in chamber 56.

As shown more particularly in Figure 4, the radial slots 27 formed in the flange 38 are considerably longer than the sliding abutments 28, with their inner ends extending inwardly of the shoulder 16 on the side walls 13 and 14. Therefore, the portion of the radial slots which are always above the sliding abutments 28 will form a chamber or pocket 62 of varying capacity and particularly when these abutments are moving inwardly towards the center of the engine at opposite sides of the horizontal plane passing through the axis of the shaft 10. The ends of the flanges 38 are provided with passages 63 which connect the chambers or pockets 51 with the chambers 62 so that gases which are collected in the chambers 62 may pass into the pockets 51 and into the arcuately shaped groove 60.

When the abutments reach points in their rotation which are in the vertical plane passing through the axis of the shaft or upon opposite sides of the vertical plane and adjacent thereto, the chambers 62 will have been sufficiently reduced to force out all the mixture as such chambers approach the exhaust conduit 21. Since, however, the pockets 52 are not in any way connected with the chambers 62, the last mentioned chambers will retain a portion of the mixture at maximum pressure until said chamber is alined with the groove 60.

The time required for the rotor to travel from the horizontal position indicated at $x$ in Figure 4 to a point designated by the numeral 67 will determine the proper proportions of the capacity of the chamber and the passages 63.

It will be appreciated that chambers 62 are merely additional tho limited storage spaces for the compressed gases and allow for the reduction of the size of the chambers 51 and 52, and which reduction in the capacity of said chambers is very desirable for the efficient operation of the engine. The decreasing chambers 54—56 between the respective sliding abutments 28 are not subjected to the pressure in channel 60. Chamber 57 is the first to be subjected to the pressure from the burning combustible mixture in groove 60 since such chamber is created above the horizontal line $x$ as shown in Figure 4.

Each time an abutment passes the exhaust port 21, the spent gases are released to the atmosphere or to a muffler. While the spent gases are being released to the atmosphere, the abutments upon opposite sides of the chambers 54, 55 and 56 are moving toward the horizontal indicated at $x$ and progressively compressing the new charge.

Having now described the internal combustion engine and the method of operating said engine on the combustible mixture, I will now proceed to describe an engine which is operated by means of a heavy fuel. Certain additional features will be described which are necessary for the proper operation of the engine by means of a heavy fuel and compressed air which are incorporated in the engine adapted to be operated by a combustible mixture and these additional features will have no effect whatever on the engine when operated by means of a combustible mixture.

An arcuately shaped channel 61 is formed in the packing ring 33 and is connected with a supply of heavy fuel through a passage or conduit 72 which is drilled through the side walls 13 and 14 of the housing. The conduit 72 has a port 73 which opens into the arcuately shaped channel 61.

The outer ends of the abutments as shown more particularly in Figures 4 and 10 are provided with pockets 71 which are adapted to aline with the arcuately shaped passage 61 when the sliding abutment 28 approaches the horizontal indicated at $x$ in Figure 4. The pockets 71 are located adjacent the outer ends of each abutment and said pockets are brought nearer to the arcuately shaped channel 61 as the abutments recede when they move from the lower vertical position to the horizontal position indicated at $x$. At the time that the abutment has approximately reached its maximum inward position, its respective pockets 71 are placed in communication with the channel 61.

The operation of the device when the heavy fuel is employed is as follows:

Air is supplied to the intake 20 either under pressure or is drawn in at atmospheric pressure. Heavy fuel under pressure is supplied through the conduit 72 and to the arcuately shaped channel 61 through the port 73. As each abutment recedes adjacent the arcuately shaped channel 61, each pocket 71 will gradually be alined with said channel and receive a predetermined quantity of fuel. As soon as the pockets 71 pass the horizontal indicated at $x$ in Figure 4, the contents of the pocket will be discharged into the channel 60 where the air which has been compressed to its maximum in chamber 56 causes spontaneous ignition of the heavy fuel developing a high pressure in chamber 57 which is carried to chamber 58 through the arcuately shaped groove 60, the air expanding at high pressure and acting on the abutments adjacent the channel 60 and causing the abutments to be impelled along their circular path for causing revolution of the shaft 10. The exhausting of the fuel takes place in a manner which is identical with the exhausting of the spent gases when the engine is operated by a combustible mixture.

Due to the high compression of the air which is found in chamber 57, the oil from each pocket 71 is ignited so that no additional means is required for causing ignition as may be the case when the engine is operated by means of a combustible mixture. Furthermore, since chambers 57, 58 and 59 are in communication with each other, there will always be some of the burning gases in said chamber which will aid in maintaining the ignition of the heavy fuel which is brought into contact with the highly compressed air in chamber 57. When starting, the engine, as is the case in Diesel engines, is preferably started by air under pressure. When the engine is properly functioning the compressed air may be eliminated.

In either case when the sliding abutments pass the ports 18 in rapid succession, a vacuum will be created and the air will be drawn through the intake 19 past port 18 and into the chamber 53 and the air would be carried along and be compressed progressively until the maximum pressure is reached in the chamber 56. Also in this case, air is compressed in the pockets 51 and 52 and in the variable chambers 62 and this compressed air is carried past the horizontal indicated at $x$ and distributed by the medium of the arcuately shaped channel 60.

The small passage 75 is provided in each of the sliding abutments which is adapted to have its inner end moved into the chamber 49 when the sliding abutments approach the horizontal so that lubricant from the chamber may find its way towards the packing strips 30. A passage 76 is provided in each of the side walls 13 and 14 to permit draining of the lubricant from the chamber 49 when desired. A port 77 at the inner end of each chamber 49 provides means for filling the channel which is in communication with the interior of the engine or with the chamber 49, which lubricant, and these ports and passages also provide an outlet to permit the escape of air or gases.

An arcuately shaped channel 80 is formed in the packing ring 33 as shown in Figure 3 and is in communication with the exhaust passage 21 so that as the abutments 28 pass the exhaust passage, the pockets 71 in the ends of the abutments and the chambers 51 and 52 will aline with the groove and discharge any burned gases into the exhaust passage. The pockets 51 and 52 as shown more particularly in Figure 2 are in communication with the chambers 53—56 inclusive so that as the gases in these chambers are compressed, the gases will be compressed likewise in said pockets. Due to the fact, however, that the gases are compressed to their maximum in chamber 56, the gases or air will be compressed to its maximum in pocket 52 since this pocket is in communication with the chamber 56 while nearly a maximum pressure is in a pocket 51 and this is due to the fact that pocket 52 is closed before the maximum pressure is reached. Furthermore pocket 51 is in communication by means of the channel 63 with the restricted channels 70a in which the members 70 slide and the degree of compression is slightly lowered in pockets 51 since the space between the outer end of the channel 70a and the member 70 is being increased as the sliding abutments 28 reached the horizontal position. The compression therefore in pocket 52 will be sufficiently high to cause the ignition of the combustible mixture or the heavy oil when the compressed gases or air from pocket 52 are discharged into the groove 60.

What I claim is:

1. A rotary engine comprising a housing having elliptical shoulders, a rotor revolubly mounted about the shoulders, said rotor having radial slots, abutments slidably mounted in said slots and having their inner ends riding over the elliptical shoulders for causing radial movement of the abutments, said housing having an elliptical inner wall engaged by the outer free ends of the sliding abutments, the rotor being in contact with the elliptically shaped wall of the housing at diametrically opposite points, but spaced from the remaining portion of said wall, the spaces formed by the abutments and side walls of the rotor and housing providing variable compression and combustion chambers, means for supplying a combustible fluid to the chambers at a point in the travel of the rotor where said abutments have been extended the limit of outward movement, and an exhaust conduit connected with the housing, said rotor having a cylindrical portion and annular flanges at each end of the cylindrical portion, and lateral chambers being located in one of the flanges, and communicating with the combustion and compression chamber.

2. A rotary engine comprising a housing having elliptical shoulders, a rotor revolubly mounted about the shoulders, said rotor having radial slots, abutments slidably mounted in said slots and having their inner ends riding over the elliptical shoulders for causing radial movement of the abutments, said housing having an elliptical inner wall engaged by the outer free ends of the sliding abutments, the rotor being in contact with the elliptically shaped wall of the housing at diametrically opposite points, but spaced from the remaining portion of said wall, the spaces formed by the abutments and side walls of the rotor and housing providing variable compression and combustion chambers, means for supplying a combustible fluid to the chambers at a point in the travel of the rotor where said abutments have been extended the limit of outward movement, and an exhaust conduit connected with the housing, said rotor having a cylindrical portion and annular flanges at each end of the cylindrical portion, and lateral chambers being located in one of the flanges, said flanges having restricted passages for connecting the slots with the lateral chambers.

3. A rotary engine comprising a housing having elliptical shoulders, a rotor revolubly mounted about the shoulders, said rotor having radial slots, abutments slidably mounted in said slots and having their inner ends riding over the elliptical shoulders for causing radial movement of the abutments, said housing having an elliptical inner wall engaged by the outer free ends of the sliding abutments, the rotor being in contact with the elliptically shaped wall of the housing at diametrically opposite points, but spaced from the remaining portion of said wall, the spaces formed by the abutments and side walls of the rotor and housing providing variable compression and combustion chambers, means for supplying a combustible fluid to the space between the rotor and the elliptical wall and between each pair of sliding abutments at a point where said abutments have been extended the limit of outward movement, and an exhaust conduit connected with the housing, said rotor having a cylindrical portion and annular flanges at each end of the cylindrical portion, and lateral chambers being located in one of the flanges, said flanges having restricted passages for connecting the slots with the lateral chambers, said slots forming storage space for compressed and burning combustible mixture.

4. A rotary engine comprising a housing having elliptical shoulders, a rotor revolubly mounted about the shoulders, said rotor having radial slots, abutments slidably mounted in said slots and having their inner ends riding over the elliptical shoulders for causing radial movement of the abutments, said housing having an elliptical inner wall engaged by the outer free ends of the sliding abutments, the rotor being in contact with the elliptically shaped wall of the housing at diametrically opposite points, but spaced from the remaining portion of said wall, the spaces formed by the abutments, the side walls of the rotor and the housing providing variable compression and combustion chambers, means for supplying a combustible fluid to the chambers at a point in the travel of the rotor where said abutments have been extended the limit of outward movement, and an exhaust conduit connected with the housing, said rotor having a cylindrical portion and annular flanges at each end of the cylindrical portion, the slots extending through the cylindrical portion and flanges, said flanges having a restricted pocket opening into each variable chamber.

5. A rotary engine comprising a housing having elliptical shoulders, a rotor revolubly mounted about the shoulders, said rotor having radial slots, abutments slidably mounted in said slots and having their inner ends riding over the elliptical shoulders for causing radial movement of the abutments, said housing having an elliptical inner wall engaged by the outer free ends of the sliding abutments, the rotor being in contact with the elliptically shaped wall of the housing at diametrically opposite points, but spaced from the remaining portion of said wall, the spaces formed by the abutments, and side walls of the rotor and housing providing variable compression and combustion chambers, means for supplying a combustible fluid to the chambers at a point in the travel of the rotor where said abutments have been extended the limit of outward movement, and an exhaust conduit connected with the housing, said rotor having a cylindrical portion and annular flanges at each end of the cylindrical portion, the slots extending through the cylindrical portion and flanges, a packing strip engaging one of the flanges, a groove in the packing strip connecting a series of variable chambers together, the last chamber of the series of variable chambers being connected by the groove being adjacent the exhaust conduit.

6. The construction as set forth in claim 4 and characterized by the fact that lateral chambers are provided in the flanges of the rotor and extend through said flanges.

7. A rotary engine comprising a housing, a rotor revolubly mounted in the housing, said rotor having radial slots, abutments slidably mounted in the slots, means engaging with the inner ends of the abutments for causing radial movement of said abutments, variable compression and combustion chambers being formed between the abutments and the walls of the rotor and housing, means for supplying a combustible fluid to the chambers at a point in the travel of the rotor where said abutments have been extended the limit of their outward movements, an exhaust conduit connected with the housing, said rotor having a cylindrical portion and annular flanges at each end of the cylindrical portion, packing strips disposed on each side of the flanges, said strips being provided with grooves connecting a plurality of the chambers together.

8. A rotary engine comprising a housing, a rotor revolubly mounted in the housing, said rotor having radial slots, abutments slidably mounted in the slots, means engaging with the inner ends of the abutments for causing radial movement of said abutments, variable compression and combustion chambers being formed between the abutments and the walls of the rotor and housing, means for supplying a combustible fluid to the chambers at a point in the travel of the rotor where said abutments have been extended the limit of their outward movements, an exhaust conduit connected with the housing, said rotor having a cylindrical portion and annular flanges at each end of the cylindrical portion, packing strips disposed on the outer face of each flange, one of said strips being provided with a groove on the inner face thereof and connecting a series of variable chambers together.

9. A rotary engine comprising a housing, a rotor revolubly mounted in the housing, said rotor having radial slots, abutments slidably mounted in the slots, means engaging with the inner ends of the abutments for causing radial movement of said abutments, variable compression and combustion chambers being formed between the abutments and the walls of the rotor and housing, means for supplying a combustible fluid to the chambers at a point in the travel of the rotor where said abutments have been extended the limit of their outward movements, an exhaust conduit connected with the housing, said rotor having a cylindrical portion and annular flanges at each end of the cylindrical portion, packing rings engaging the flanges of the rotor, one of the packing rings having an arcuately disposed groove connecting a series of variable chambers along a path where combustion of the fuel takes place, with the force of the ignited fuel being exerted against each abutment when said abutment arrives at a point substantially diametrically opposite the supply means for the combustion fluid.

10. A rotary engine comprising a housing, a rotor revolubly mounted in the housing, said rotor having radial slots, abutments slidably mounted in the slots, means engaging with the inner ends of the abutments for causing radial movement of said abutments, variable compression and combustion chambers being formed between the abutments and the walls of the rotor and housing, means for supplying a combustible fluid to the chambers at a point in the travel of the rotor where said abutments have been extended the limit of their outward movements, an exhaust conduit connected with the housing, said rotor having a cylindrical portion and annular flanges at each end of the cylindrical portion, packing rings engaging the flanges of the rotor, one of the packing rings having an arcuately disposed groove connecting a series of variable chambers along a path where combustion of the fuel takes place with the force of the ignited fuel being exerted against each abutment when it arrives at a point substantially diametrically opposite the combustion mixture supplying means, the variable chamber succeeding the abutment which receives the force of the exploding mixture discharging directly into the exhaust conduit.

HENRY F. MOLKENBUR.